Inventor
Frank Davidson, Sr.

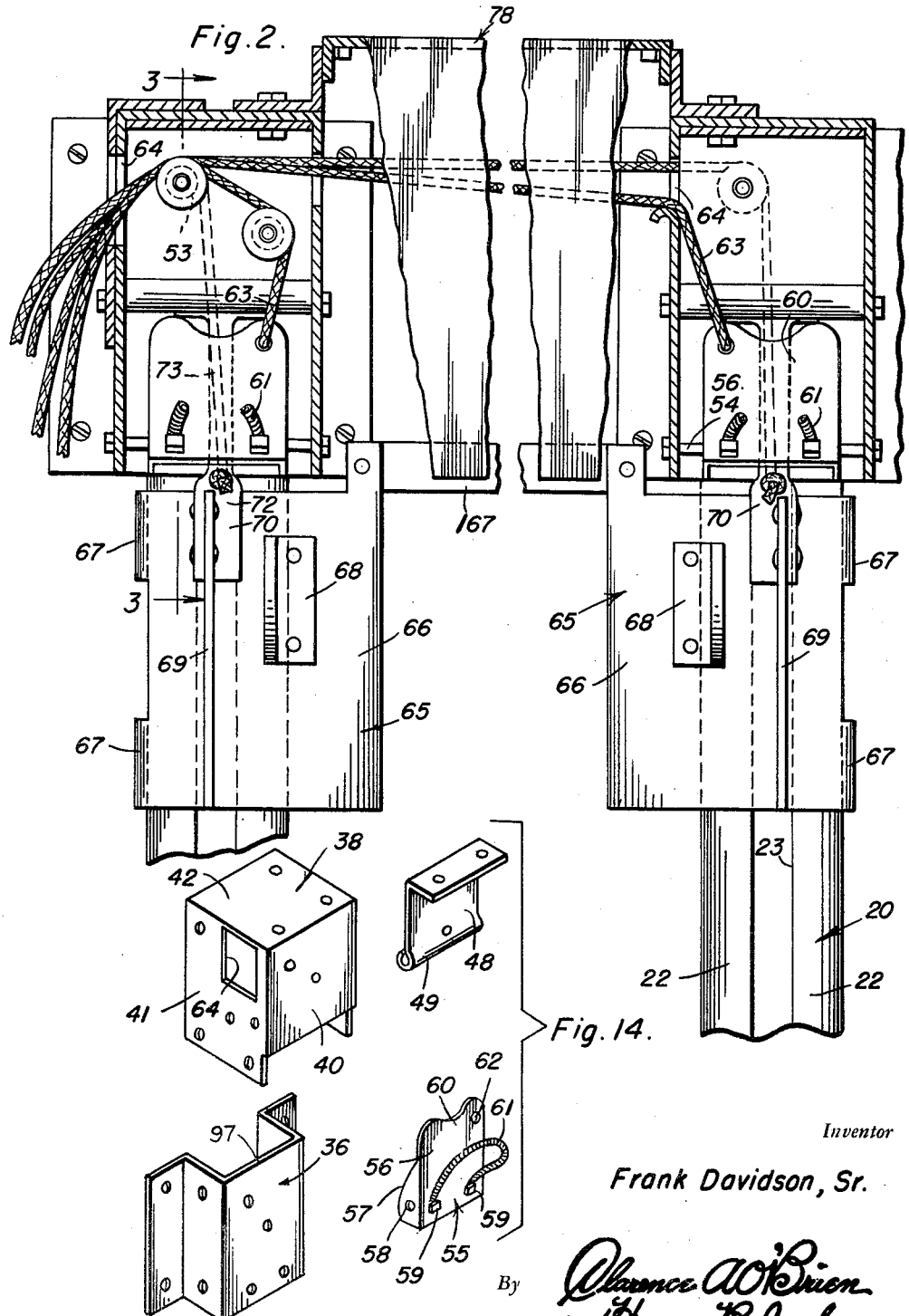

March 13, 1951   F. DAVIDSON, SR   2,544,950
ADJUSTABLE SHADE AND CURTAIN HANGER
Filed Oct. 21, 1947   5 Sheets-Sheet 3
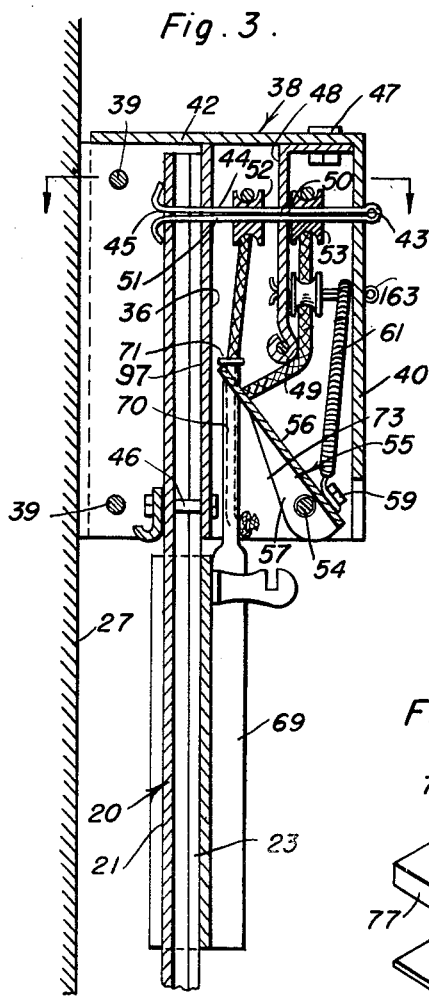
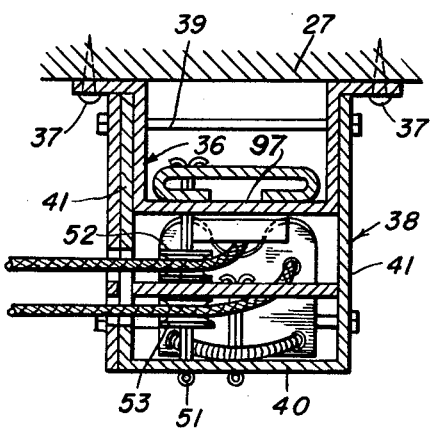
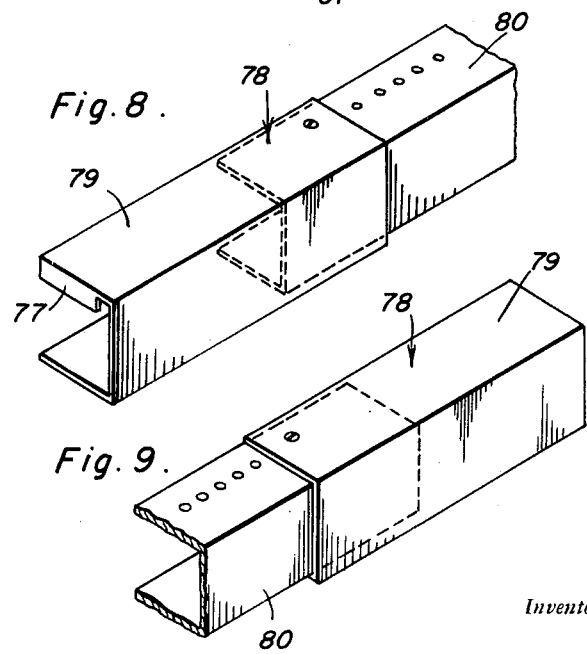
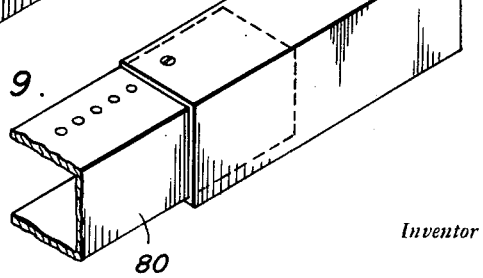
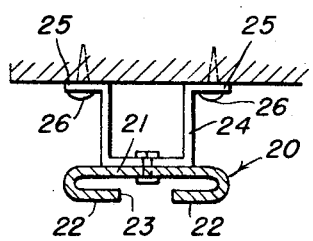
Inventor
Frank Davidson, Sr.
By Clarence A. O'Brien
and Harvey B. Jacobson
Attorneys March 13, 1951 F. DAVIDSON, SR 2,544,950
ADJUSTABLE SHADE AND CURTAIN HANGER
Filed Oct. 21, 1947 5 Sheets-Sheet 4
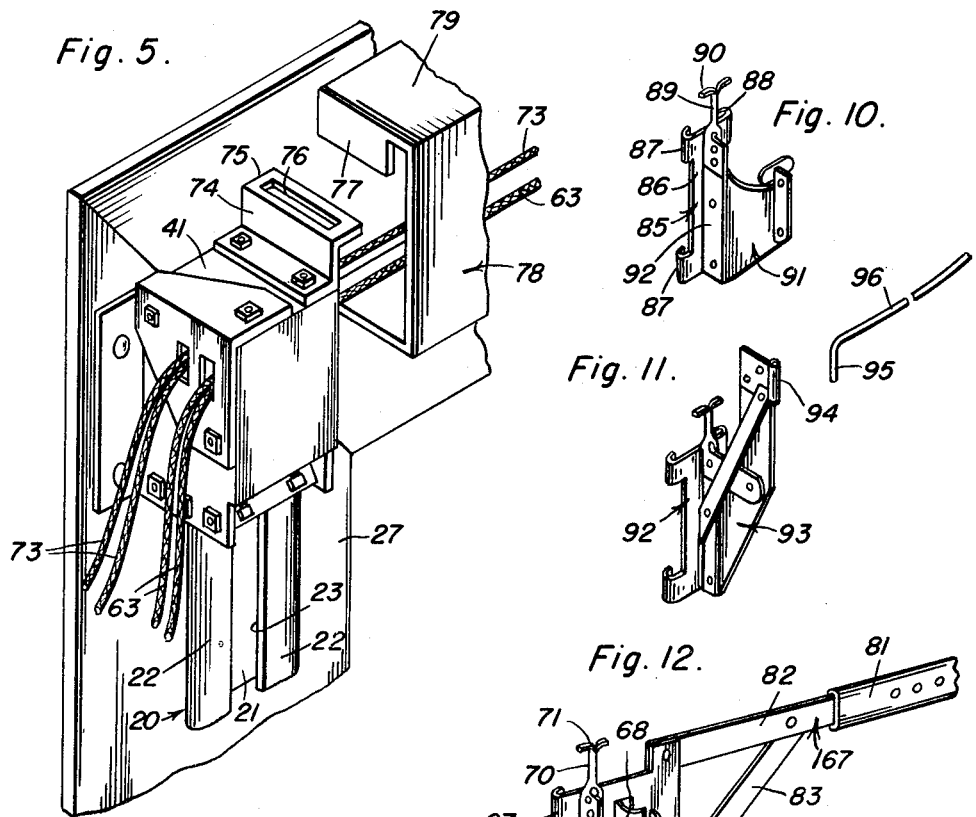
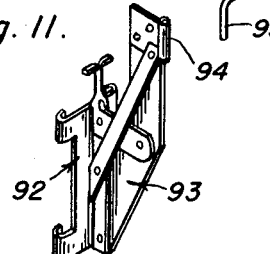
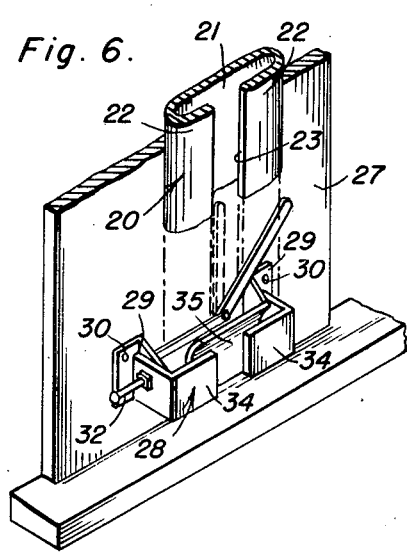
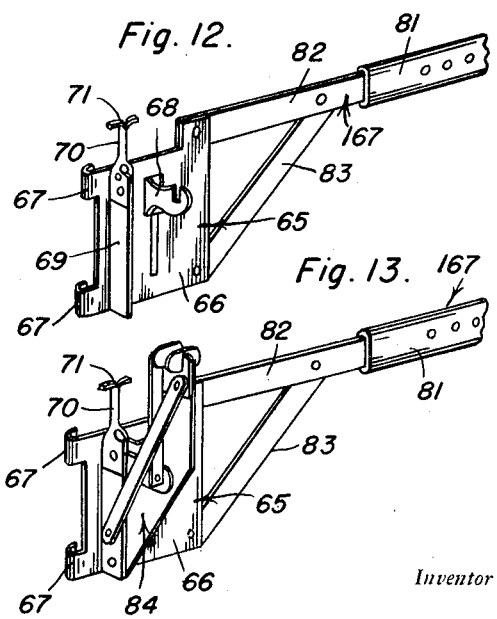
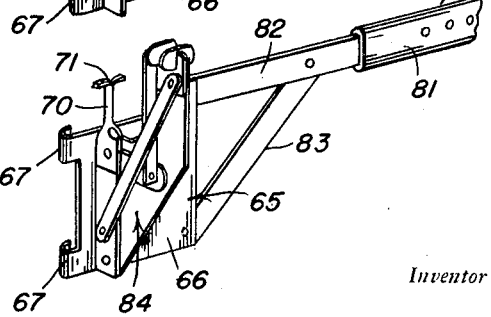
Inventor
Frank Davidson, Sr.
By Clarence A. O'Brien
and Harvey B. Jacobson
Attorneys March 13, 1951  F. DAVIDSON, SR  2,544,950
ADJUSTABLE SHADE AND CURTAIN HANGER
Filed Oct. 21, 1947  5 Sheets-Sheet 5

Inventor
Frank Davidson, Sr.

By Clarence A. O'Brien
and Harvey B. Jacobson
Attorneys

Patented Mar. 13, 1951

2,544,950

UNITED STATES PATENT OFFICE 2,544,950

ADJUSTABLE SHADE AND CURTAIN HANGER

Frank Davidson, Sr., Los Angeles, Calif.

Application October 21, 1947, Serial No. 781,227

5 Claims. (Cl. 211—103)

1

This invention relates to an adjustable shade and curtain hanger and has for its primary object to facilitate the ventilation of a room or other enclosure.

Another object is to enable window shades of different widths to be employed with the same hanger, and to enable the hanger to be applied to window frames of differing widths.

A further object is to facilitate the supporting of curtains, draperies, and the like of different types and styles, according to the desires of the user.

The above and other objects may be attained by employing this invention which embodies among its features a pair of vertical trackways adapted to be fixed to the vertical side members of a window frame, a carriage mounted to slide along each trackway, means at the upper ends of the trackways for raising or lowering the carriages in unison, and means on the carriages for supporting a window shade, and draperies of various kinds.

Other features include a suspension pin projecting upwardly from each carriage, releasable means for engaging the suspension pins and holding the carriages elevated, means to release the releasable means to permit the pins and carriages to move downwardly under the influence of gravity, and suspension cords connected to the carriages and operable through the releasable means for holding the carriages in various adjusted positions on the tracks.

In the drawings:

Figure 1 is a front view of a window casing illustrating this improved adjustable shade and curtain hanger in position thereon, Figure 2 is a fragmentary enlarged sectional view through the upper end of the device showing the front walls of the various elements broken away more clearly to illustrate the details of construction, Figure 3 is a fragmentary vertical sectional view taken substantially along the line 3—3 of Figure 2, Figure 4 is a horizontal sectional view taken substantially along the line 4—4 of Figure 3, Figure 5 is a fragmentary perspective view of the upper left-hand corner of the window frame showing this device in position thereon, Figure 6 is a fragmentary perspective view of the lower end of the same side of the device as that illustrated in Figure 5, Figure 7 is a fragmentary horizontal sectional view taken substantially along the line 7—7 of Figure 1, said view being on a somewhat enlarged scale,

2

Figure 8 is a fragmentary perspective view of one end of the header bar,

Figure 9 is a similar view of the opposite end of the header bar,

Figure 10 is a perspective view of one type of carriage,

Figure 11 is a perspective view of a modified form of carriage,

Figure 1:
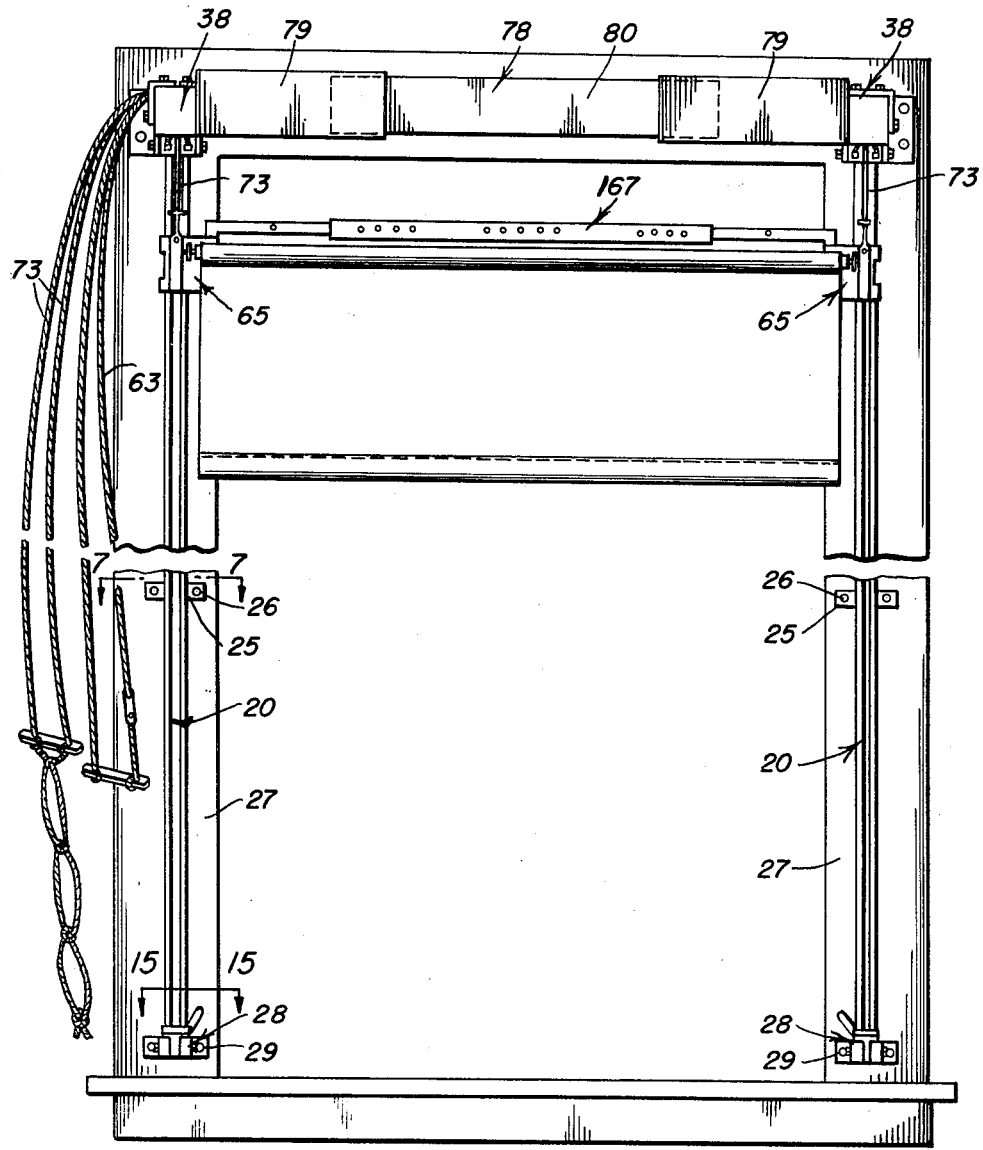
Figure 16:
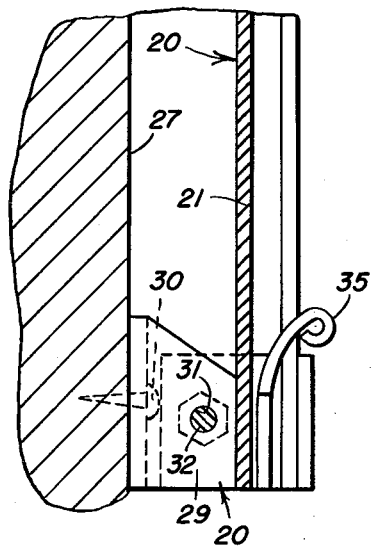
Figure 17:
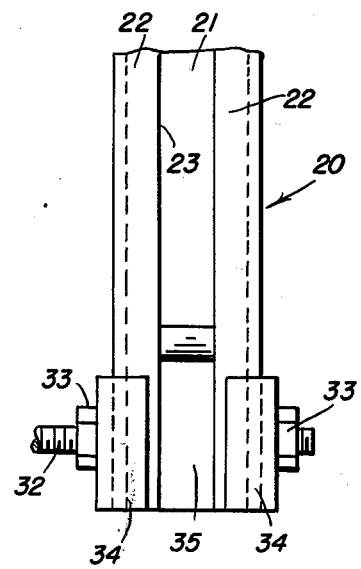
Figure 15:
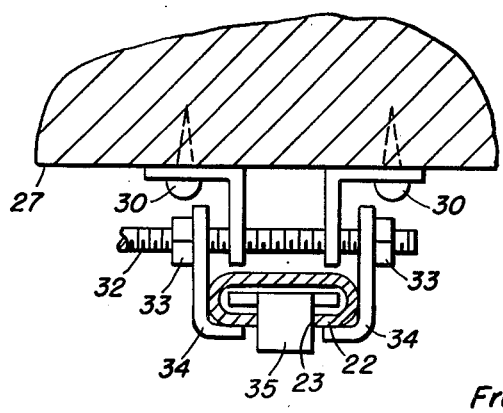

Figure 12 is a perspective view of a further modified type of carriage illustrating a fragment of a tie bar coupled thereto, Figure 13 is a further modified form of carriage illustrating a fragment of a tie bar coupled thereto, Figure 14 is a collective view illustrating various details in perspective, Figure 15 is a fragmentary sectional view taken substantially along the line 15—15 of Figure 1 on a somewhat enlarged scale, Figure 16 is a vertical sectional view through Figure 15, and Figure 17 is a front view of Figure 15.

Referring to the drawings in detail, this improved shade and curtain support comprises a pair of vertically disposed parallel tracks each designated generally 20. Each track comprises an elongated body 21 provided along opposite side edges with longitudinally extending flanges 22 which are turned inwardly and lie in spaced parallel relation to the body 21 to form between their opposing edges a longitudinal slot 23. Each track 20 is provided intermediate its ends with a substantially U-shaped bracket 24 provided with laterally extending ears 25 through which suitable fastening means such as screws 26 are adapted to be projected for securing the brackets and tracks to the vertical side members 26 of a conventional window frame.

The lower end of each track 20 is supported in a suitable clamp designated generally 28 which comprises a pair of spaced angle brackets 29 secured to the vertical side members 27 of the window frame as by attaching screws 30. The arm of each angle bracket 29 which projects perpendicularly from the side member 27 of the window frame is pierced as at 31 to support a clamp screw 32. This clamp screw extends along an axis which lies perpendicular to the longitudinal axis of the track 20, and threaded onto the screw on opposite sides of the track 20 are nuts 33 which are welded or otherwise attached to angle shaped clamp members 34 which when the screw is turned in one direction are advanced into clamping engagement with the lower end of the track, rigidly to support the same and serve as stops to prevent the carriages, to be more fully hereinafter described, from accidental disengagement from the tracks. A suitable stop member 35 also is supported in each clamp member 34 to form a stop for engaging the bottom end of a carriage.

The upper end of each track 20 enters a channel-shaped member or bracket 36 which is attached to the upper end of each side rail or member 27 of the window frame as by attaching screws 37. The web portion of the member 36 is vertically disposed in a housing 38 and forms a partition wall 97 therein. The housing 38 is detachably connected to the bracket 36 as by suitable bolts 39, and includes a front wall 40, side walls 41 and a top wall 42. The front wall 40 is formed near its upper end with an opening 43, and formed in the bracket 36 and the track 20 are openings 44 and 45 respectively, which align axially with the opening 43. A suitable bolt 46 extends through the web portion or partition wall 97 of the bracket near its lower end and also projects through the portion 21 of the track 20 to hold the parts in proper position. Detachably connected as by a bolt 47 to the top wall 42 of each housing 38 is an angle bracket 48, one leg of which projects downwardly in parallel relation to the front wall 40 and terminates at its lower end in a smoothly rounded portion 49 for a purpose to be more fully hereinafter explained. The depending leg of the bracket 48 is also provided near its upper end with an opening 50, which aligns axially with the openings 43, 44 and 45 and for the reception of a cotter pin 51 which serves as the axle about which guide pulleys 52 and 53 rotate.

Mounted for rocking motion on a shaft 54 which extends parallel with the bolts 39 and is located near the lower front corner of the housing, is a clutch and clamp plate designated generally 55 which comprises a body member 56 having along opposite side edges angular flanges 57 which are pierced as at 58 to receive the shaft 54. Fixed as at 59 adjacent the end of the plate 56 opposite the bifurcations 60 therein are opposite ends of a retractile coil spring 61, and formed in one of the arms formed in the plate 56 by the bifurcation 60 is a notch 62 the purpose of which will be more fully hereinafter explained. As illustrated in Figure 3, the intermediate portion of the spring 61 extends upwardly near the front wall 40 of the housing 38, and extending through the front wall and through the bracket 48 are aligned openings for the reception of a cotter pin 163 which serves to tension the spring 61 and cause the plate 55 to rock rearwardly so that its bifurcated end engages the bracket 36.

Extending through the openings 62 of each plate 56 is one end of a control cord or cable 63 which is knotted on the underside of the plate and is trained over the pulley 53 in its respective housing 38 so that when pull is exerted on the opposite end of the control cord or cable 63, the latch plate to which it is attached will be moved against the effort of its respective spring 61. As illustrated, the cables 63 are carried outwardly through openings 64 formed in the side walls of their respective housings, to a point within easy reach of the user.

Mounted for vertical sliding movement on each track 20 is a carriage designated 65, each of which comprises a base plate 66 carrying along one edge guide flanges 67 which are adapted to embrace the outer edges of the tracks 20. In the preferred embodiment of the invention, the plates 66 are coupled together by a cross bar 167, and each plate carries on its outer face a shade bracket 68 of conventional form. Extending outwardly from the front face of each plate intermediate its ends is a flange 69 to the upper end of which is attached a vertically extending latch pin 70 which projects upwardly beyond the upper edge of its respective plate 66 and carries at its upper end a head 71 which when the carriages 65 are elevated engages the latch plate 55 on its respective side of the window in order to suspend the carriages in their upmost position. Formed in each pin 70 near its junction with its respective plate 66 is an opening 72, and extending through said opening is one end of a suspension cord or cable 73 which is knotted or otherwise secured to prevent withdrawal of the cable through the opening. Each cable 73 is carried upwardly and over the guide pulley 52 on its respective side of the window frame to a point within easy reach of the user, and serves to suspend its respective carriage in vertically adjusted position on the tracks 20.

From the foregoing, it will be obvious that when the window shade is to be supported in its uppermost position, the heads of the suspension pins 70 are engaged with the upper ends of the bifurcated portions of the plates 56. When it is desired to lower the carriages pull is exerted on the cables 73 slightly to elevate the carriages and move the heads 71 of the pins 70 clear of the latch plates 55. Having thus cleared the latch plates pull is exerted on the cables 63 to move the latch plates against the effort of the springs 61, causing the plates to swing about their pivots 54, so as to move their notched ends away from contact with the respective brackets 36. The pull on the suspension cables 73 may then be released and the carriages 65 lowered to the desired position, whereupon the tension on the cables 63 is released to permit the latch plates 55 to move under the influence of their respective springs 61 and effect a clamping action on the suspension cables between the latch plates 55 and the brackets 36, thus to hold the carriages at the desired point on the tracks. Obviously, when it is desired to return the shade to elevated position, pull is exerted on the suspension cables 73, thus causing the carriages to ride upwardly until the heads 71 of the suspension pins 70 are re-engaged by the latch and clamp plates 55.

In the preferred form of the invention, each housing 38 has secured to its top wall 42 an angle bracket 74 having a horizontal flange 75 equipped with an elongated slot 76 for the reception of a tongue 77 formed on the end of a rectangular housing 78 which as illustrated in Figures 2 and 5, is adapted to extend across the upper end of the window frame to form an enclosure for the portions of the cables 63 and 73 which extend between the housings 38. This housing 78 comprises tubular sleeve members 79 into which a tubular section 80 is telescopically entered. It will thus be seen that the device may be employed on windows of different widths.

The cross bar 167 is likewise telescopically constructed so that a sleeve member 81 receives in opposite ends, opposed arms 82 which are fixed to their respective carriages. A suitable brace bar 83 may be employed in order properly to support its respective arm 82 in a position substantially perpendicular to the vertical axes of the plates 66. In Figure 13, I have illustrated a suitable attachment designated generally 84 which is adapted to be mounted on the flange 69 of the respective carriages 65 for supporting certain types of curtain or drapery supports or rods.

In Figure 10, I have illustrated a further modification of my invention in which a carriage designated generally 85 is illustrated which is adapted to be substituted for the carriage 65 previously described. Each carriage 85 comprises a base plate 86 provided along opposite side edges with inturned flanges 87 and 88 which are adapted to embrace opposite side edges of the tracks 20 in order properly to guide the carriages along the tracks. Each carriage is provided with an upwardly extending suspension pin 89 which like the suspension pins 70 is equipped at its upper end with a head 90. A suitable supporting bracket 91 is attached to the outstanding flange 92 of each plate 86 for supporting the desired type of drapery or curtain supporting rod. In the modification illustrated in Figure 11, the carriage designated generally 92 is constructed in conformity with the structure of the carriage 85 and carries a supporting arm designated generally 93 provided at its upper end with a socket 94 for the reception of a hooked end 95 of a curtain or drapery supporting rod 96.

Obviously, by releasing the clamps 28 at the lower end of each track 20 the carriages 65 may be removed and a suitable carriage such as that illustrated in Figure 10 or that illustrated in Figure 11 may be easily and quickly substituted, and the clamps again tightened.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. An adjustable shade and curtain hanger comprising a pair of spaced parallel tracks adapted to be mounted on opposite side rails of a window casing, a carriage slidable vertically on each track, a shade bracket on each carriage, a suspension member projecting upwardly from each carriage, a housing and a U-shaped bracket connected to the upper end of each track, guide means within each housing, flexible means attached to each suspension member and operatively carried by the guide means in the housing on its respective side of the window, a clamp plate pivoted within each housing for engagement with the suspension member releasably to hold the member and its respective carriage in elevated position and when the member is released to clamp the flexible means against the U-shaped bracket on its respective side of the device, means urging the plate against the flexible means, and manually controlled means operable from one side of the hanger simultaneously to release both clamp plates.

2. An adjustable shade and curtain hanger comprising a pair of spaced parallel tracks adapted to be mounted on opposite side rails of a window casing, a carriage slidable vertically on each track, a shade bracket on each carriage, a suspension pin projecting upwardly from each carriage, a housing and a U-shaped bracket connected to the upper end of each track, a guide pulley mounted within each housing, a suspension cord attached to each suspension pin and trained over the pulley in the housing on its respective side of the window, a latch and clamp plate pivoted within each housing for engagement with the suspension pin releasably to hold the pin and its respective carriage in elevated position and when the pin is released to clamp the suspension cord against the U-shaped bracket on its respective side of the device, manually controlled means operable from one side of the hanger simultaneously to release both latch and clamp plates, and spring means within each housing and coupled to the latch and clamp plate therein yieldingly to urge the latch and clamp plate into latching and clamping position.

3. An adjustable shade and curtain hanger comprising a pair of spaced parallel tracks adapted to be mounted on opposite side rails of a window casing, a carriage slidable vertically on each track, a shade bracket on each carriage, a suspension pin projecting upwardly from each carriage, a housing and a U-shaped bracket connected to the upper end of each track, a guide pulley mounted within each housing, a suspension cord attached to each suspension pin and trained over the pulley in the housing on its respective side of the window, a latch and clamp plate pivoted within each housing for engagement with the suspension pin releasably to hold the pin and its respective carriage in elevated position and when the pin is released to clamp the suspension cord against the U-shaped bracket on its respective side of the device, a release cord connected at one end to each latch and clamp plate, said release cords leading to one side of the window for a manual manipulation and a retractile spring connected to each latch and clamp plate and to its respective housing yieldingly to hold its respective plate in latching and clamping position.

4. An adjustable shade and curtain hanger comprising a pair of spaced parallel tracks adapted to be mounted on opposite side rails of a window casing, a carriage slidable vertically on each track, a shade bracket on each carriage, a suspension pin projecting upwardly from each carriage, a housing and U-shaped bracket connected to the upper end of each track, a guide pulley mounted within each housing, a suspension cord attached to each suspension pin and trained over the pulley in the housing on its respective side of the window, a latch and clamp plate pivoted within each housing for engagement with the suspension pin releasably to hold the pin and its respective carriage in elevated position and when the pin is released to clamp the suspension cord against the U-shaped bracket on its respective side of the device, manually controlled means operable from one side of the hanger simultaneously to release both latch and clamp plates, and means at the lower end of each track detachably to connect the track to its respective side rail.

5. In a shade and curtain bracket suspension and control device for retaining a shade and curtain bracket in various vertical positions on a window frame, a vertically disposed track, a shade and curtain carriage mounted to run along the said track, a housing at the upper end of the track having a front wall, said housing being open at its bottom and having the upper end of the track extending therethrough, a channel-shaped member having a partition wall extending vertically in the housing substantially midway between the front and back of the housing, means for securing said channel-shaped member to said front wall and said track to said partition wall, said means consisting of a bolt extending through the partition wall near its lower edge and through said track for connection to said housing, and a cotter pin extending through said front wall, partition wall and track near the top of said housing to hold said track against swinging movement, a latch and clamp plate having a notched free edge pivotally mounted in the housing to rock about an axis parallel to the front face of the track, a curtain and shade bracket suspension cord passing over said cotter pin and beneath the latch and clamp plate and coupled at one end to the shade and curtain bracket, a spring coupled to said front wall of said housing and to said latch and clamp plate to yieldingly urge said notched edge of the plate toward said track and to clamp said suspension cord, and manually operable means for moving said latch and clamp plate against the effort of said spring.

FRANK DAVIDSON, Sr.

REFERENCES CITED

The following references are of record in the file of this patent:

UNITED STATES PATENTS

| Number | Name | Date |
|---|---|---|
| 562,017 | Murdock | June 16, 1896 |
| 588,454 | Lloyd | Aug. 17, 1897 |
| 2,132,067 | Cleveland | Oct. 4, 1938 |
| 2,229,898 | Pastva | Jan. 28, 1941 |
| 2,374,605 | Lundstrom | Apr. 24, 1945 |